United States Patent
Kure et al.

(10) Patent No.: US 8,644,155 B2
(45) Date of Patent: Feb. 4, 2014

(54) MULTI-HOP WIRELESS TERMINAL AND TRAFFIC CONTROL METHOD THEREOF

(75) Inventors: Yoshinobu Kure, Kanagawa (JP); Eisaburo Itakura, Kanagawa (JP); Yutaka Takahashi, Shiga (JP); Shoji Kasahara, Nara (JP); Kensaku Wakuda, Osaka (JP)

(73) Assignee: Sony Corporation (JP)

( * ) Notice: Subject to any disclaimer, the term of this patent is extended or adjusted under 35 U.S.C. 154(b) by 556 days.

(21) Appl. No.: 12/735,401

(22) PCT Filed: Jan. 23, 2009

(86) PCT No.: PCT/JP2009/051074
§ 371 (c)(1),
(2), (4) Date: Jul. 9, 2010

(87) PCT Pub. No.: WO2009/096332
PCT Pub. Date: Aug. 6, 2009

(65) Prior Publication Data
US 2011/0044170 A1    Feb. 24, 2011

(30) Foreign Application Priority Data
Jan. 29, 2008 (JP) .................. 2008-017048

(51) Int. Cl.
*H04J 1/16* (2006.01)
(52) U.S. Cl.
USPC ............ 370/235; 370/229; 370/231
(58) Field of Classification Search
USPC ............ 370/235, 412, 395.4, 468, 229, 231
See application file for complete search history.

(56) References Cited

U.S. PATENT DOCUMENTS

| | | | | |
|---|---|---|---|---|
| 6,101,193 A | * | 8/2000 | Ohba | 370/429 |
| 7,075,890 B2 | * | 7/2006 | Ozer et al. | 370/230 |
| 7,289,821 B2 | * | 10/2007 | Kim et al. | 455/512 |
| 7,532,629 B2 | | 5/2009 | Ebata | |
| 2005/0036475 A1 | | 2/2005 | Nishiyama et al. | |

FOREIGN PATENT DOCUMENTS

| | | |
|---|---|---|
| JP | 2003-273788 A | 9/2003 |
| JP | 2004-312542 A | 11/2004 |
| JP | 2005-020163 A | 1/2005 |
| JP | 2005-269343 A | 9/2005 |

* cited by examiner

*Primary Examiner* — Huy D Vu
*Assistant Examiner* — Kuo T Chiang
(74) *Attorney, Agent, or Firm* — Lerner, David, Littenberg, Krumholz & Mentlik, LLP

(57) ABSTRACT

A multi-hop wireless terminal having a user application section, a traffic control section and a wireless transmitting/receiving section, the traffic control section enqueuing a packet of a transmission flow from the user application section and a packet of a forward flow from the wireless transmitting/receiving section in queues different for each flow and performing traffic control, where the traffic control section includes a queue manager for sorting a packet of each input flow into a corresponding queue and enqueuing the packet, and a packet scheduler for dequeuing a packet from each queue and outputting the packet, and where the packet scheduler selects from the queues a queue from which a packet is to be dequeued and output, based on transmission information of each of the flows.

8 Claims, 6 Drawing Sheets

CASE WHERE FAIRNESS OF TRANSMISSION RIGHT AMONG
TERMINALS IS MAINTAINED BY RTS/CTS SCHEME

CASE WHERE FAIRNESS OF TRANSMISSION RIGHT AMONG TERMINALS
IS NOT MAINTAINED BY RTS/CTS SCHEME

MULTI-HOP WIRELESS TERMINAL AND TRAFFIC CONTROL METHOD THEREOF

TECHNICAL FIELD

The present invention relates to a multi-hop wireless terminal configuring a multi-hop wireless network and a traffic control method thereof. More particularly, the present invention relates to a multi-hop wireless terminal and the like for maintaining, by enqueuing packets of flows in queues different for each flow and selecting a queue from which a packet is to be dequeued and output based on transmission information of each flow, fairness of transmission rate of each queue and also fairness of transmission rate among the flows independent of the number of hops.

BACKGROUND ART

A multi-hop wireless network is receiving attention, which relays communication between terminals in a wireless environment to make it possible for a wireless terminal to communicate with a remote base station. However, with the multi-hop wireless network using a single channel, there is a problem that throughputs vary for wireless terminals whose number of hops from a base station differ from each other.

That is, the throughput is lower for a wireless terminal whose number of hops from a base station is greater than for a wireless terminal whose number of hops from a base station is less. The reason is that IEEE802.11MAC protocol generally used in the wireless terminal link layer takes only a single-hop communication into consideration. In the single-hop communication, the timing of transmission and reception between terminals capable of sensing each other is properly controlled by a communication control called RTS/CTS. However, in a multi-hop communication where not all the terminals can be sensed, it becomes hard to maintain fairness of transmission right among terminals due to problems of the protocol.

FIG. 6 shows a case where the fairness of transmission right among terminals is maintained by RTS/CTS, and FIG. 7 shows a case where the fairness of transmission right among terminals is not maintained by RTS/CTS. In FIGS. 6 and 7, solid-line circles indicate respective wireless terminals, broken-line circles indicate communication ranges of the respective terminals, and arrows indicate the transmission direction of data. The numerals in the solid-line circles indicate the terminal number.

FIG. 6 shows a case where terminal 1 and terminal 2 performs transmission to terminal 0. In this case, for example, at the time of transmission by terminal 1, a Request-To-Send (RTS) signal is transmitted to terminal 0 before the transmission, and a Clear-To-Send (CTS) signal is transmitted from terminal 0 that received the RTS signal. When the CTS signal is received, except for the terminal that transmitted the RTS signal, none of the terminals within the communication range of terminal 0 performs transmission during the transmission by terminal 1, and thus, fairness among the terminals is maintained.

On the other hand, in the example shown in FIG. 7, RTS/CTS control is performed as in the case shown in FIG. 6 before transmission from terminal 1 to terminal 0, but the CTS signal from terminal 0 does not reach terminals other than terminal 1. However, transmission data from terminal 1 reaches terminal 2, and when terminal 3 simultaneously transmits an RTS signal to terminal 2 to perform transmission, collision occurs, and terminal 2 cannot receive the RTS signal from terminal 3.

Thus, terminal 3 retransmits the RTS signal. However, the waiting time at this time, that is a so-called back-off time, is longer than the usual back-off time, and thus, the probability of terminal 3 obtaining the transmission right is reduced compared to those of terminal 1 and terminal 2.

In a multi-hop wired network, as a means for improving the fairness of throughput among terminals, there is a round-robin scheduling that provides a relay terminal with a queue for each flow. However, in the multi-hop wireless network, since the fairness of transmission right among terminals is not maintained as described above, the fairness cannot be achieved with the simple round-robin scheduling. On the other hand, if transmission is suspended until packets arrive from respective flows, almost complete fairness can be achieved. However, if the transmission rate of each terminal differs from each other, the transmission is performed at the lowest transmission rate, and thus, there is a problem that the communication bandwidth is not efficiently used.

For example, a technology is described in Patent Document 1, which resolves the problem of a throughput gap resulting from the difference in hop count numbers in a multi-hop wireless network by determining packet size based on hop count information of each packet.

[Patent Document] JP-A-2003-273788

DISCLOSURE OF THE INVENTION

Problems to be Solved by the Invention

The technology described in Patent Document 1 described above determines packet size based on hop count information of each packet, and thus, it is needed to acquire the hop count information of each packet, and also to adjust the packet size, thereby requiring a complicated process.

The object of the present invention is provide a multi-hop wireless terminal and a traffic control method thereof capable of achieving fairness of transmission rate among flows, independent of the number of hops, without requiring a complicated process.

Means for Solving the Problems

To solve the above-described problem, according to an embodiment of the present invention, there is provided a multi-hop wireless terminal having a user application section, a traffic control section and a wireless transmitting/receiving section, the traffic control section enqueuing a packet of a transmission flow from the user application section and a packet of a forward flow from the wireless transmitting/receiving section in queues different for each flow and performing traffic control, where the traffic control section includes a queue manager for sorting the packet of each input flow into a corresponding queue, and a packet scheduler for dequeuing the packet from each queue and outputting the packet, and where the packet scheduler selects from the queues a queue from which a packet is to be dequeued and output, based on transmission information of each of the flows.

Furthermore, a packet of each flow is enqueued in a queue different for each flow, and traffic control is performed. That is, the packet of each input flow is sorted into a corresponding queue and enqueued by the queue manager. Then, the packet is dequeued and output from each flow by the packet scheduler. In this case, a queue from which a packet is to be dequeued and output is selected based on transmission information of each flow, such as transmission rate, the number of transmission packets, or the like, and thus, fairness of transmission rate of each queue is maintained and fairness of transmission rate among the flows, independent of the number of hops, is achieved.

For example, as the transmission information of each flow, the count value of a weight counter provided for each queue is used. Each time there is a packet output request, the packet scheduler performs the following process. That is, if there are packets in queues, count values of whose weight counters are 1 or more, probabilities for the respective queues to be selected as the queue from which a packet is to be dequeued and output are determined based on the ratio of the count values of the weight counters of the respective queues. Also, if there are no packets in queues, count values of whose weight counters are 1 or more, and if there are packets in queues, count values of whose weight counters are 0, after incrementing the count values of the weight counters of all the queues, probabilities for the respective queues to be selected as the queue from which a packet is to be dequeued and output are determined based on the ratio of the count values of the weight counters of the respective queues. Then, when the count value of the weight counter of a queue selected as the queue from which a packet is to be dequeued and output is greater than 0, the count value of the weight counter is decremented.

In this case, the count value of the weight counter of each queue is appropriately incremented or decremented so as to achieve fairness of transmission rate among the flows. Thus, with the probabilities for the respective queues to be selected as the queue from which a packet is to be dequeued and output determined based on the ratio of the count values of the weight counters of the respective queues, fairness of transmission rate among the flows, independent of the number of hops, is achieved.

For example, a maximum value is set for the count value of the weight counter of each queue. In a case as described above where the count value of the weight counter of each queue is controlled, the count value of the weight counter of a queue for a flow with low transmission rate is decremented with less frequency and the count value grows large, and thus, the probability for the queue for the flow with low transmission rate to be selected as the queue from which a packet is to be dequeued and output increases. With a maximum value set for the count value of the weight counter of each queue, the transmission rate of all the flows can be prevented from decreasing to the level of a flow with low transmission rate.

Furthermore, for example, when there is no packet in a queue that is selected as the queue from which a packet is to be dequeued and output, the packet scheduler may suspend the output of packet for a certain period of time. As such, with the output of packet suspended for a certain period of time, it becomes easier for other terminals to acquire the transmission right, and thereby unfairness of transmission rate among the terminals in a multi-hop wireless transmission can be restrained and fairness of transmission rate among the flows, independent of the number of hops, can be achieved.

Furthermore, for example, the packet scheduler provides an activity counter for each queue, and when there is no packet in a queue that is selected as the queue from which a packet is to be dequeued and output and output of packet is not performed, may increment or decrement the count value of the activity counter of the queue, and when the count value of the activity counter of a certain queue reaches a predetermined value, may have the queue to be not selected as the queue from which a packet is to be dequeued and output until a packet is input to the queue.

That the count value of the activity counter of a certain queue reaches the predetermined value means that the transmission rate of the flow corresponding to the queue is low and a packet is not input in the queue for a certain period of time. As described above, with the queue, count value of whose activity counter reached the predetermined value, not being selected as the queue from which a packet is to be dequeued and output until a packet is input, another queue is selected as the queue from which a packet is to be dequeued and output, and thus, the transmission rate of all the flows can be prevented from decreasing to the level of a flow with low transmission rate.

As described above, according to the present invention, a packet of each flow is enqueued in a queue different for each flow, and a queue from which a packet is to be dequeued and output is selected based on transmission information of each flow. Thus, a high degree of fairness of transmission rate among the flows can be maintained.

BEST MODE FOR CARRYING OUT THE INVENTION

Figure 1:
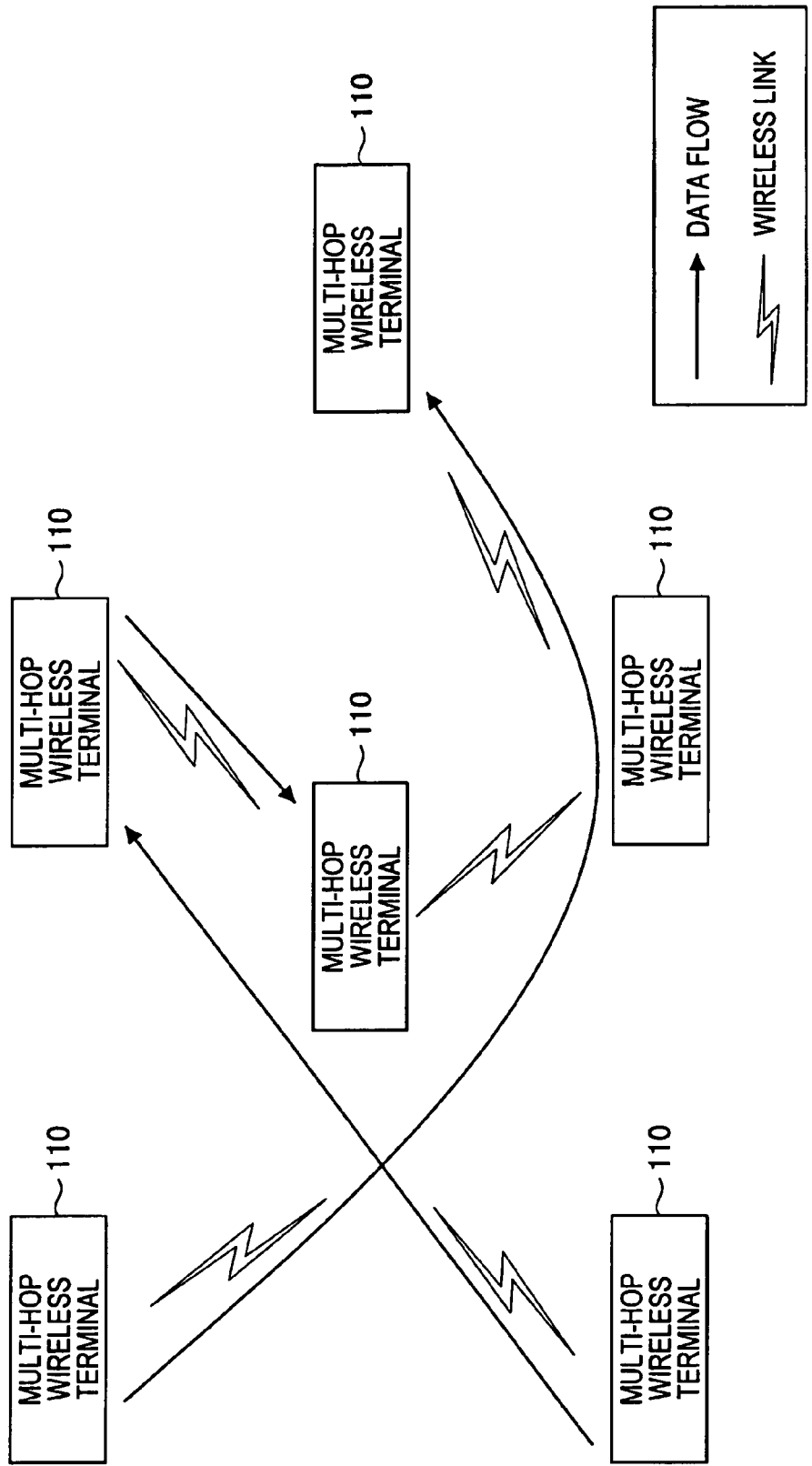
FIG. 1 is a block diagram showing a configuration example of a multi-hop wireless network according to an embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted. FIG. 1 shows a configuration example of a multi-hop wireless network 100 according to an embodiment. The multi-hop wireless network 100 is configured by a plurality of multi-hop wireless terminals 110 mutually connected over wireless links.

In this multi-hop wireless network 100, by relaying a data flow from each multi-hop wireless network 110 by another multi-hop wireless network 110, it is made possible to transmit the data flow to a multi-hop wireless terminal 110 outside a communication range where communication over a wireless link is possible.

The multi-hop wireless terminal 110 in the multi-hop wireless network 100 shown in FIG. 1 automatically adjusts the weight of a weighted round-robin scheduling and achieves fairness of transmission rate among the flows, independent of the number of hops. Furthermore, when there is no packet to be transmitted in a queue selected at the time of transmission, the multi-hop wireless terminal 110 in the multi-hop wireless network 100 shown in FIG. 1 suspends the transmission of packets for a certain period of time and, without handing over the transmission right to another queue, lets another terminal have the transmission right, thereby restraining unfairness of transmission right among the terminals in a multi-hop wireless transmission and achieving fairness of transmission rate among the flows, independent of the number of hops.

Figure 2:
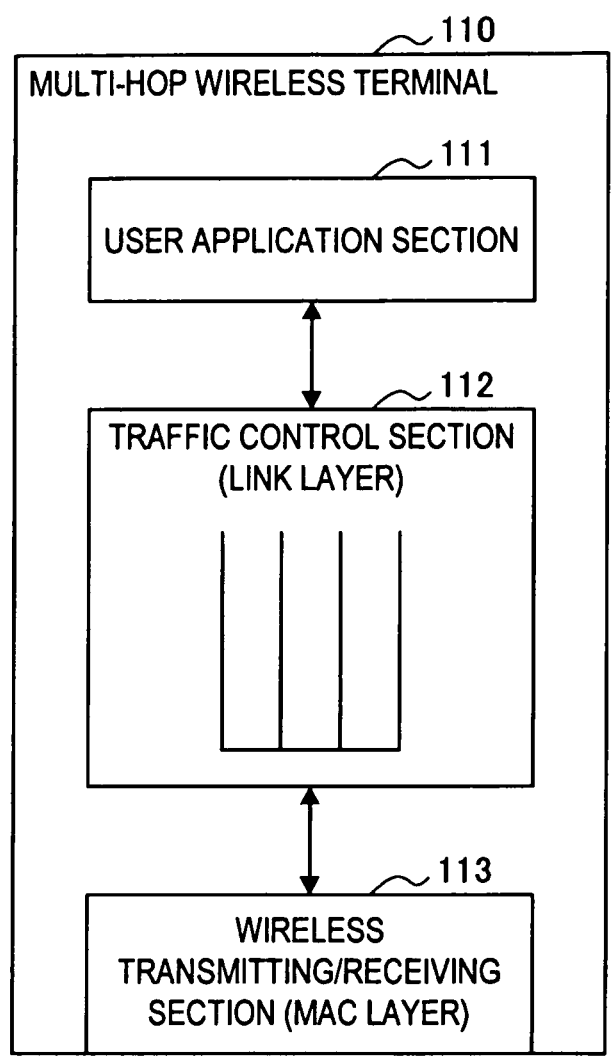
FIG. 2 is a block diagram showing a configuration example of a multi-hop wireless terminal.

FIG. 2 shows a configuration example of the multi-hop wireless terminal 110. The multi-hop wireless terminal 110 has a user application section 111, a traffic control section 112 and a wireless transmitting/receiving section 113.

The user application section 111 exchanges data with the traffic control section 112 in response to a data transmission/reception request from a user application. That is, when requested for transmission by the application, the user application section 111 passes, to the traffic control section 112, application transmission data as a transmission data flow from that terminal itself. Furthermore, when notified by the traffic control section 112 of data addressed to that terminal itself, the user application section 111 receives the data, and passes the data to the application.

The traffic control section 112 enqueues a packet of a transmission flow from the user application section 111 and a packet of a forward flow from the wireless transmitting/receiving section 113 in queues (transmission queues) different for each flow, and performs traffic control. When data received from the wireless transmitting/receiving section 113 is addressed to that terminal itself, the traffic control section 112 passes the data to the user application section 111. The details of the traffic control section 112 will be further described later.

The wireless transmitting/receiving section 113 transmits/receives data to/from another terminal, and exchanges data to be transmitted or data to be received with the traffic control section 112. As the wireless transmitting/receiving section 113, a wireless communication device compliant with IEEE 802.11 prescribing the RTS/CTS control function is used, for example.

The operation of the multi-hop wireless terminal 110 shown in FIG. 2 will be described. When transmission is requested by the application, the application transmission data (transmission flow) is passed from the user application section 111 to the traffic control section 112.

Furthermore, at the wireless transmitting/receiving section 113, data transmitted from another terminal is received and is passed to the traffic control section 112. When the data that the traffic control section 112 received from the wireless transmitting/receiving section 113 is data addressed to that terminal itself, the traffic control section 112 notifies the user application section 111 of the data. At the user application section 111, the data from the traffic control section 112 is received based on the notification, and is passed to the application.

Furthermore, at the traffic control section 112, a packet of a transmission flow from that terminal itself received from the user application section 111 and a packet of a forward flow from the wireless transmitting/receiving section 113 are enqueued in queues (transmission queues) different for each flow. Then, at the traffic control section 112, a packet is dequeued from each queue, and the dequeued packets are transmitted from the wireless transmitting/receiving section 113 to another terminal. Additionally, at the traffic control section 112, a queue from which a packet is to be dequeued and output is selected based on transmission information of each flow.

Next, the details of the traffic control section 112 will be described.

Figure 3:
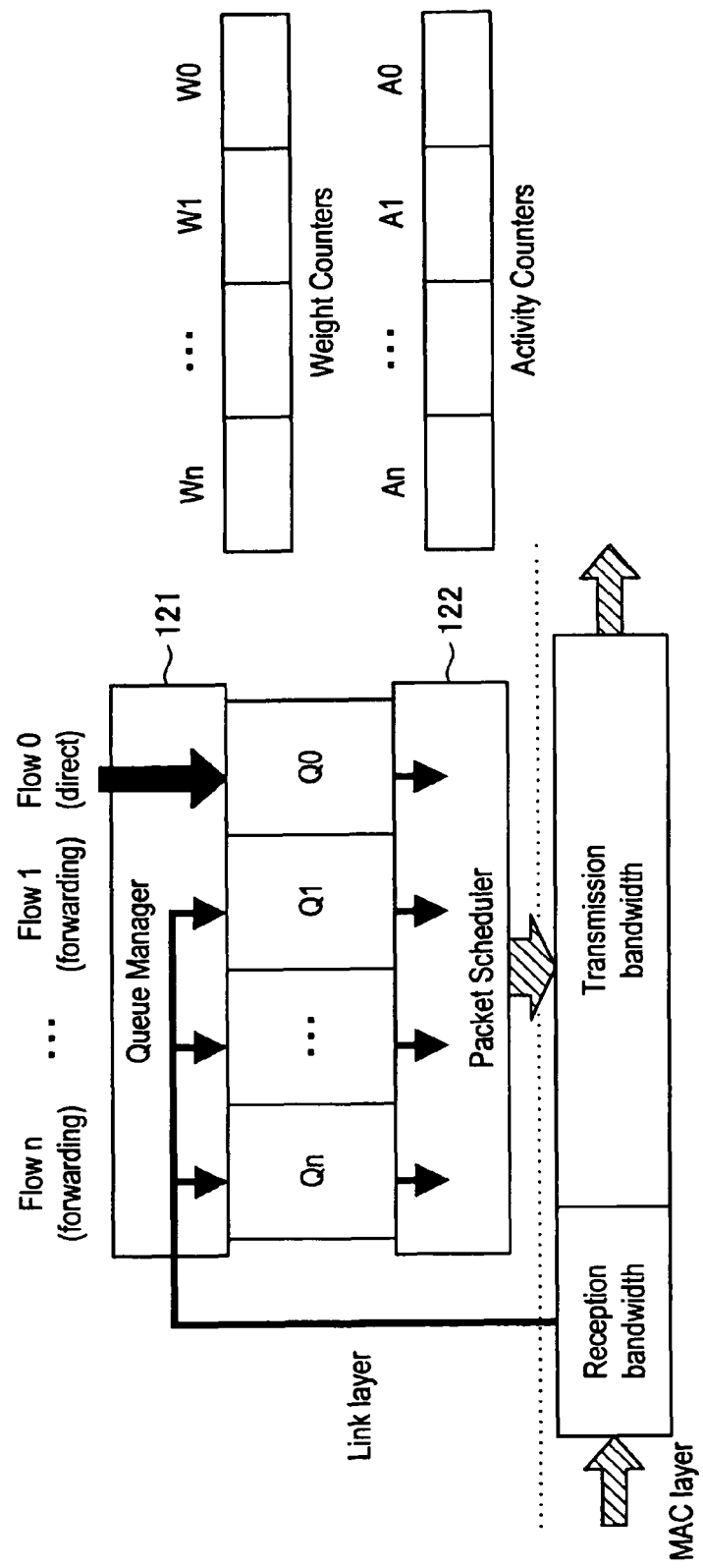
FIG. 3 is a block diagram showing a model of a traffic control section configuring the multi-hop wireless terminal.

FIG. 3 shows an example of the traffic control section 112. The traffic control section 112 includes queues (Q0, Q1, . . . , Qn) corresponding to respective flows (Flow 0, Flow 1, . . . , Flow n), weight counters (W0, W1, . . . , Wn) corresponding to respective queues (Q0, Q1, . . . , Qn), and activity counters (A0, A1, . . . , An) corresponding to respective queues (Q0, Q1, . . . , Qn). Here, Flow 0 is the transmission flow from that terminal itself input from the user application section 111. Further, Flow 1, . . . , Flow n are the forward flows input from the wireless transmitting/receiving section 113.

A queue manager 121 is located at the input part of the flows. Furthermore, a packet scheduler 122 is located at the output part of the flows. The queue manager 121 sorts a packet of each input flow into a corresponding queue and enqueues the packet. Furthermore, the packet scheduler 122 dequeues a packet from each queue and outputs the packet. Additionally, the reception bandwidth and the transmission bandwidth shown in the lower part of FIG. 3 schematically show a MAC layer bandwidth.

Figure 4:
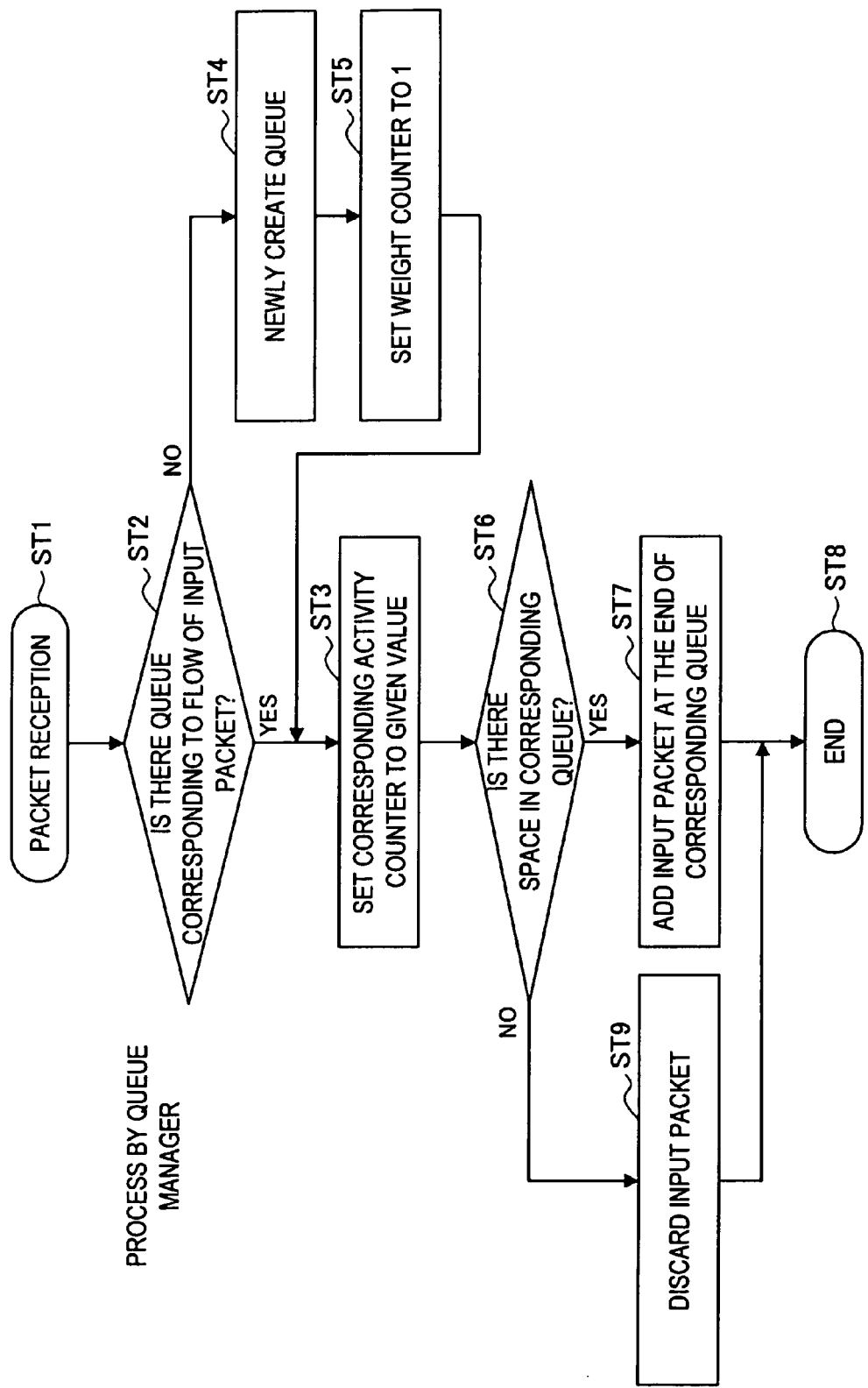
FIG. 4 is a flow chart describing a process by a queue manager configuring the traffic control section.

A process by the queue manager 121 will be described. FIG. 4 is a flow chart showing the process by the queue manager 121.

The queue manager 121 starts the process when a packet is input in step ST1, and then, proceeds to the process of step ST2. In step ST2, the queue manager 121 decides whether a queue corresponding to the flow of the input packet exists or not. When a queue corresponding to the flow of the input packet exists, the queue manager 121 instantly proceeds to the process of step ST3. On the other hand, when a queue corresponding to the flow of the input packet does not exist, the queue manager 121 proceeds to the process of step ST4.

In step ST4, the queue manager 121 newly creates a queue corresponding to the flow of the input packet. Incidentally, when newly creating a queue as such, a weight counter and an activity counter corresponding to the queue are also created at the same time. Then, in step ST5, the queue manager 121 sets the count value of the weight counter for the newly created queue to 1, and then, proceeds to the process of step ST3.

In step ST3, the queue manager 121 sets the count value of the activity counter for the queue corresponding to the flow of the input packet to a given value. Here, the given value for the activity counter indicates an allowed number of times up to which a queue is not invalidated even if an event successively occurs where the queue is selected but there is no packet in the queue to be transmitted.

If the given value is too small, a queue is invalidated when there is no packet input for the queue even for a short time, and thus, it becomes hard to maintain fairness between the flows of the queue and another queue. On the other hand, if the given value is too large, a queue remains valid even when there is no packet input for the queue for a long time, and thus, the efficiency of the use of the bandwidth is decreased. Accordingly, the given value for the activity counter should be appropriately set in accordance with the traffic characteristics.

Next, in step ST6, the queue manager 121 decides whether there is a space in the queue corresponding to the flow of the input packet or not. When there is a space in the queue, the queue manager 121 adds, in step ST7, the input packet at the end of the queue corresponding to the flow of the input packet, and then, in step ST8, ends the process.

On the other hand, when it is decided in step ST6 that there is no space in the queue, the queue manager 121 discards the input packet in step ST9, and then, in step ST8, ends the process.

With the process shown by the flow chart of FIG. 4 described above, each time a packet of the transmission flow or of the forward flow is input, the queue manager 121 sorts the packet into a corresponding queue, and enqueues the packet.

Figure 5:
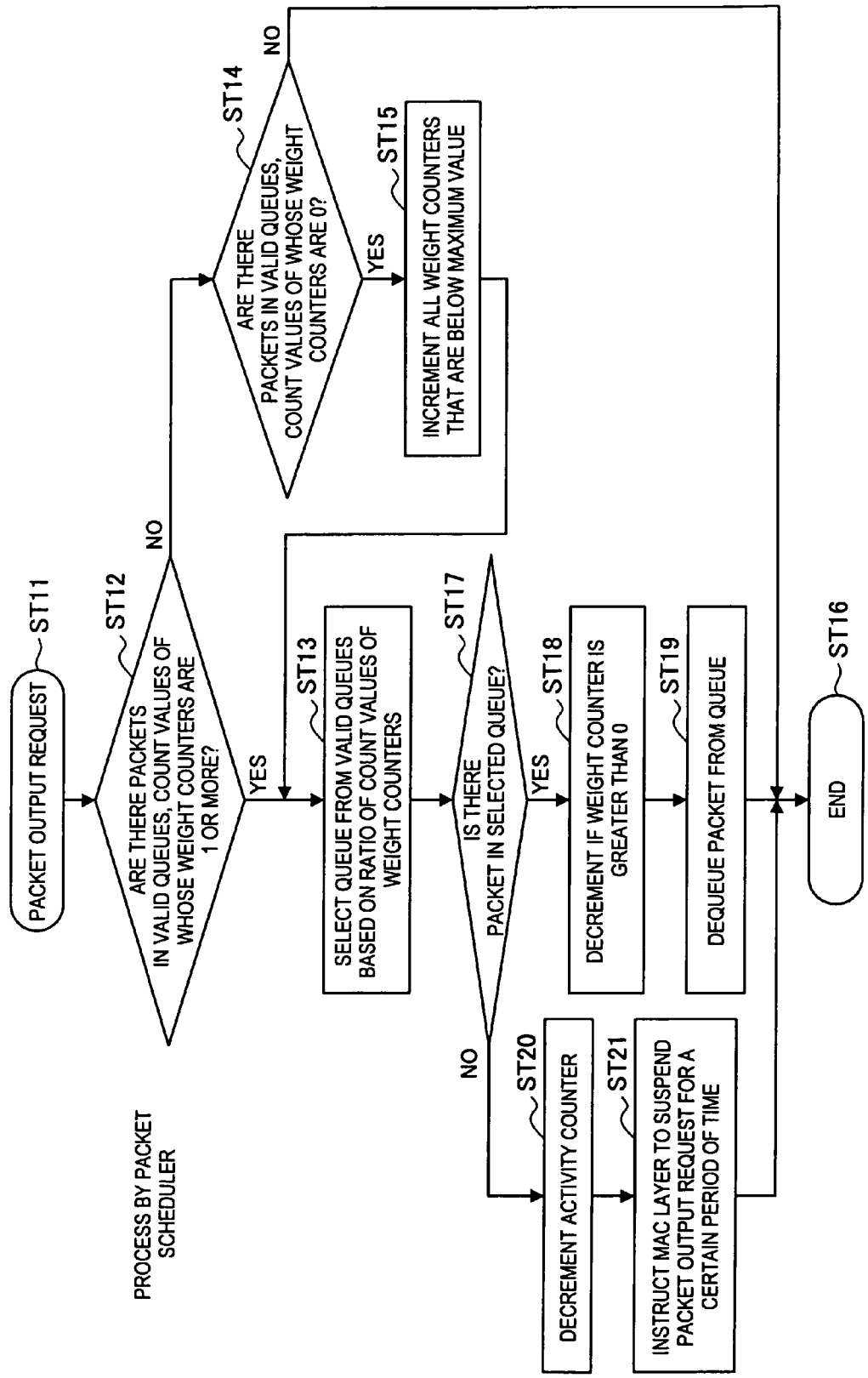
FIG. 5 is a flow chart describing a process by a packet scheduler configuring the traffic control section.
Figure 6:
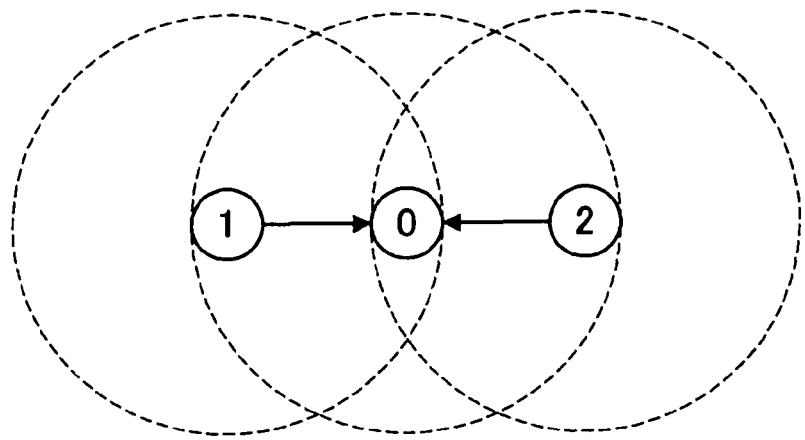
FIG. 6 is a diagram showing a case where fairness of transmission right among terminals is maintained by RTS/CTS.
Figure 7:
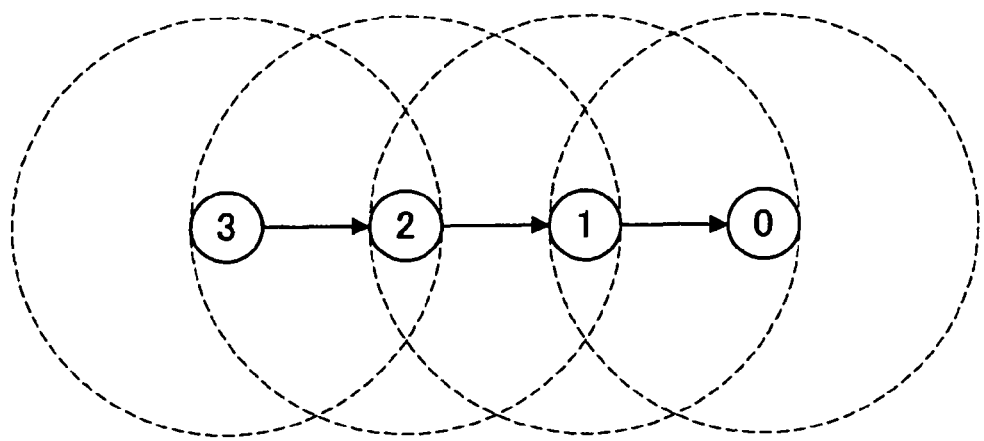
FIG. 7 is a diagram showing a case where fairness of transmission right among terminals is not maintained by RTS/CTS.

Next, a process by the packet scheduler 122 will be described. The flow chart of FIG. 5 shows the process by the packet scheduler 122.

The packet scheduler 122 starts the process when there is a packet output request in step ST11, and then, proceeds to the process of step ST12. Here, the packet output request is supplied from the wireless transmitting/receiving section 113. That is, the wireless transmitting/receiving section 113 has an one-packet buffer for temporarily storing a packet to be transmitted passed from the traffic control section 112, and when the packet stored in the one-packet buffer is transmitted and the one-packet buffer is empty, passes the packet output request to the traffic control section 112.

In step ST12, the packet scheduler 122 decides whether or not there is a packet in a queue that is valid and the count value of whose weight counter is 1 or more. Here, a valid queue means a queue, the count value of whose activity counter is 1 or more.

If the conditions for decision in step ST12 are satisfied, the packet scheduler 122 instantly proceeds to the process of step ST13. On the other hand, if the conditions for decision in step ST12 are not satisfied, the packet scheduler 122 decides, in step ST14, whether or not there is a packet in a queue that is valid and the count value of whose weight counter is 0.

If the conditions for decision in step ST14 are satisfied, the packet scheduler 122 increments, in step ST15, the count values of all the weight counters that are below a maximum value. That is, a maximum value is set beforehand for the count value of the weight counter, and the packet scheduler 122 increments the count value of each weight counter with the maximum value as the upper limit. After the process of step ST15, the packet scheduler 122 proceeds to the process of step ST13. On the other hand, if the conditions for decision in step ST14 are not satisfied, the packet scheduler 122 instantly ends the process in step ST16.

In step ST13, the packet scheduler 122 selects, from the valid queues (the count values of whose activity counters are 1 or more), a queue from which a packet is to be dequeued and output based on the ratio of the count values of the weight counters. That is, the packet scheduler 122 determines probabilities for the respective queues to be selected as the queue from which a packet is to be dequeued and output based on the ratio of the count values of the weight counters, and based on the probabilities, determines the queue from which a packet is to be dequeued and output.

For example, when Q0, Q1, Q2 are the valid queues and the count values of the corresponding weight counters W0, W1, W2 are 3, 1, 1, respectively, probabilities for queues Q0, Q1, Q2 to be selected are determined to be ⅗, ⅕, ⅕. In such a case, the probability for queue Q0 to be selected as the queue from which a packet is to be dequeued and output is 3 times those of other queues Q1, Q2.

Next, in step ST17, the packet scheduler 122 decides whether or not there is a packet in the queue selected in step ST13. When there is a packet, the packet scheduler 122 decrements, in step ST18, the count value of the weight counter of the selected queue if it is greater than 0. Then, in step ST19, the packet scheduler 122 dequeues the packet from the selected queue and outputs the packet to the wireless transmitting/receiving section 113, and then, in step ST16, ends the process.

Furthermore, when there is no packet in the queue selected in step ST17, the packet scheduler 122 decrements, in step ST20, the count value of the activity counter of the queue. Then, in step ST21, the packet scheduler 122 instructs the wireless transmitting/receiving section (MAC layer) 113 to suspend the output request for packet for a certain period of time, and then, in step ST16, ends the process.

With the process shown by the flow chart of FIG. 5 described above, the packet scheduler 122 dequeues a packet from each queue and outputs the packet to the wireless transmitting/receiving section 113 based on the count value of the weight counter of each queue as the transmission information of each flow.

Incidentally, in the flow chart of FIG. 5, since an initial set value of the count value of the activity counter is set to a given value greater than 0 (refer to step ST3 of FIG. 4), the packet scheduler 122 decrements, in step ST20, the count value of the activity counter, and at the same time, decides a queue to be valid when the count value of the activity counter is 1 or more.

However, for example, the queue manager 121 may set the initial set value of the count value of the activity counter to 0, and, in step ST20, the packet scheduler 122 may increment the count value of the activity counter, and at the same time, decide a queue to be valid when the count value of the activity counter is less than a predetermined value.

As described above, with the multi-hop wireless terminal 110 shown in FIG. 2, at the time of dequeuing and outputting a packet from a queue, probability for each queue to be selected as the queue from which a packet is to be dequeued and output is determined by the packet scheduler 122 of the traffic control section 112 based on the ratio of the count values of the weight counters of respective queues as the transmission information of each flow. And based on the probabilities for the respective queues to be selected, a queue from which a packet is to be dequeued and output is selected (step ST13 of FIG. 5). Accordingly, fairness of transmission rate of each queue can be maintained, and fairness of transmission rate among the flows, independent of the number of hops, can be achieved.

Furthermore, with the multi-hop wireless terminal 110 shown in FIG. 2, when there is no packet in a queue, the count value of whose weight counter is 1 or more, and when there is a packet in a queue, the count value of whose weight counter is 0, the packet scheduler 122 of the traffic control section 112 increments the count values of the weight counters of all the queues, and when the count value of the weight counter of the queue selected as the queue from which a packet is to be dequeued and output is greater than 0, decrements the count value of the weight counter. Thus, the count values of the weight counters are appropriately incremented or decremented so as to achieve fairness of transmission rate among the flows. Accordingly, by determining probabilities for the respective queues to be selected as the queue from which a packet is to be dequeued and output based on the ratio of the count values of the weight counters of the respective queues, fairness of transmission rate among the flows, independent of the number of hops, can be achieved.

Furthermore, with the multi-hop wireless terminal 110 shown in FIG. 2, a maximum value is set for weight counters W0, W1, . . . , Wn of the respective queues of the traffic control section 112, and the count values thereof are incremented with the maximum value as the upper limit (step ST15 of FIG. 5). Thus, the count value of the weight counter of a queue for a flow with low transmission rate is decremented (step ST18 of FIG. 5) with less frequency and the count value grows large, but the upper limit of the count value is limited by the maximum value. Accordingly, the probability for the queue for the flow with low transmission rate to be selected can be prevented from increasing limitlessly, and the transmission rate of all the flows can be prevented from decreasing to the level of a flow with low transmission rate.

Further, with the multi-hop wireless terminal 110 shown in FIG. 2, when there is no packet in a queue selected as the queue from which a packet is to be dequeued and output, the packet scheduler 122 of the traffic control section 112 suspends the output of packet for a certain period of time (step ST21 of FIG. 5). Thus, it becomes easier for other terminals to acquire the transmission right, and thereby unfairness of transmission rate among the terminals in a multi-hop wireless transmission can be restrained and fairness of transmission rate among the flows, independent of the number of hops, can be achieved.

Furthermore, with the multi-hop wireless terminal 110 shown in FIG. 2, when there is no packet in a queue selected as the queue from which a packet is to be dequeued and output, the packet scheduler 122 of the traffic control section 112 decrements the count value of the activity counter of the queue (step ST20 of FIG. 5), and when the count value of the activity counter becomes 0, the queue is eliminated from the options (valid queues) from which a queue from which a packet is to be dequeued and output is selected (steps ST12 and ST14 of FIG. 5).

That the count value of the activity counter of a certain queue reaches 0 means that the transmission rate of the flow corresponding to the queue is low and a packet is not input in the queue for a certain period of time. As described above, with the queue, the count value of whose activity counter reached 0, eliminated from the options for selection, another queue is selected as the queue from which a packet is to be dequeued and output. Accordingly, it can be prevented that the transmission rates of all the flows decrease to the level of a flow with low transmission rate.

It should be understood by those skilled in the art that various modifications, combinations, sub-combinations and alterations may occur depending on design requirements and other factors insofar as they are within the scope of the appended claims or the equivalents thereof.

For example, in the embodiment described above, an example is shown where the count value of a weight counter corresponding to each queue is used as transmission information of each flow, but it is not limited to such. For example, transmission rate of each queue, the number of transmission packets, or the like, may be actually measured to be used as the transmission information of each flow. With the queue from which a packet is to be dequeued and output selected such that the transmission rate of the respective queues or the number of transmission packets become balanced, fairness of transmission rate among the flows, independent of the number of hops, can be achieved.

[Industrial Applicability]

The present invention can be applied to a multi-hop wireless terminal configuring a multi-hop wireless network.

The invention claimed is:

1. A multi-hop wireless terminal having a user application section, a traffic control section and a wireless transmitting/receiving section, the traffic control section enqueuing a packet of a transmission flow from the user application section and a packet of a forward flow from the wireless transmitting/receiving section in queues different for each flow and performing traffic control, wherein the traffic control section includes
    a queue manager for sorting a packet of each input flow into a corresponding queue and enqueuing the packet; and
    a packet scheduler for dequeuing a packet from each queue and outputting the packet, and
wherein the packet scheduler
provides a weight counter for each queue;
    when there is a packet output request and if there are packets in queues, count values of whose weight counters are 1 or more, determines probabilities for the respective queues to be selected as the queue from which a packet is to be dequeued and output based on a ratio of each queue's weight counter value to the total sum of the weight counters for all the queues,
    when there is a packet output request and if there are no packets in queues, count values of whose weight counters are 1 or more, and there are packets in queues, count values of whose weight counters are 0, after incrementing the count values of the weight counters of all the queues, determines the probabilities for the respective queues to be selected as the queue from which a packet is to be dequeued and output based on the ratio of the count values of the weight counters of the respective queues, and
    when a count value of the weight counter of a queue selected as the queue from which a packet is to be dequeued and output is greater than 0, decrements the count value of the weight counter.

2. The multi-hop wireless terminal according to claim 1, wherein the packet scheduler suspends output of packet for a certain period of time when there is no packet in a queue selected as the queue from which a packet is to be dequeued and output.

3. The multi-hop wireless terminal according to claim 1, wherein a maximum value is set for the count value of the weight counter of each of the queues.

4. A multi-hop wireless terminal having a user application section, a traffic control section and a wireless transmitting/receiving section, the traffic control section enqueuing a packet of a transmission flow from the user application section and a packet of a forward flow from the wireless transmitting/receiving section in queues different for each flow and performing traffic control, wherein the traffic control section includes
    a queue manager for sorting a packet of each input flow into a corresponding queue and enqueuing the packet; and
    a packet scheduler for dequeuing a packet from each queue and outputting the packet, and
wherein the packet scheduler
    provides an activity counter for each queue;
    where there is no packet in a queue selected as the queue from which a packet is to be dequeued and output of packet is not performed, increments a count value of the activity counter of the queue; and
    when a count value of the activity counter of a certain queue reaches a predetermined value, does not select the certain queue as the queue from which a packet is to be dequeued and output until a packet is input to the certain queue.

5. A traffic control method of a multi-hop wireless terminal that enqueues a packet of a transmission flow from a user application section and a packet of a forward flow from a wireless transmitting/receiving section in queues different for each flow and performs traffic control, comprising the steps of:

sorting the packet of each input flow into a corresponding queue and enqueuing the packet; and
dequeuing the packet from each queue and outputting the packet,
wherein, in the step of dequeuing the packet,
    when there is a packet output request and if there are packets in queues, count values of whose weight counters, which are for the respective queues, are 1 or more, probabilities for the respective queues to be selected as the queue from which a packet is to be dequeued and output are determined based on a ratio of the count values of the weight counters of the respective queues, when there is a packet output request and if there are no packets in queues, count values of whose weight counters are 1 or more, and there are packets in queues, count values of whose weight counters are 0, after the count values of the weight counters of all the queues are incremented, the probabilities for the respective queues to be selected as the queue from which a packet is to be dequeued and output are determined based on the ratio of the count values of the weight counters of the respective queues, and when a count value of the weight counter of a queue selected as the queue from which a packet is to be dequeued and output is greater than 0, the count value of the weight counter is decremented.

6. A traffic control method of a multi-hop wireless terminal that enqueues a packet of a transmission flow from a user application section and a packet of a forward flow from a wireless transmitting/receiving section in queues different for each flow and performs traffic control, comprising the steps of:

sorting the packet of each input flow into a corresponding queue and enqueuing the packet; and dequeuing the packet from each queue and outputting the packet, wherein, in the step of dequeuing the packet, when there is no packet in a queue selected as the queue from which a packet is to be dequeued and output of the packet is not performed, a count value of an activity counter of the queue is incremented; and when a count value of an activity counter of a certain queue reaches a predetermined value, the certain queue is not selected as the queue from which a packet is to be dequeued and output until a packet is input to the certain queue.

7. A multi-hop wireless terminal having a user application section, a traffic control section and a wireless transmitting/receiving section, the traffic control section enqueuing a packet of a transmission flow from the user application section and a packet of a forward flow from the wireless transmitting/receiving section in queues different for each flow and performing traffic control, wherein the traffic control section includes a queue manager for sorting a packet of each input flow into a corresponding queue and enqueuing the packet; and a packet scheduler for dequeuing a packet from each queue and outputting the packet, and wherein the packet scheduler provides an activity counter for each queue;

where there is no packet in a queue selected as the queue from which a packet is to be dequeued and output of packet is not performed, decrements a count value of the activity counter of the queue; and when a count value of the activity counter of a certain queue reaches a value of zero, does not select the certain queue as the queue from which a packet is to be dequeued and output until a packet is input to the certain queue.

8. A traffic control method of a multi-hop wireless terminal that enqueues a packet of a transmission flow from a user application section and a packet of a forward flow from a wireless transmitting/receiving section in queues different for each flow and performs traffic control, comprising the steps of:

sorting the packet of each input flow into a corresponding queue and enqueuing the packet; and dequeuing the packet from each queue and outputting the packet, wherein, in the step of dequeuing the packet, when there is no packet in a queue selected as the queue from which a packet is to be dequeued and output of the packet is not performed, a count value of an activity counter of the queue is decremented; and when a count value of an activity counter of a certain queue reaches a value of zero, the certain queue is not selected as the queue from which a packet is to be dequeued and output until a packet is input to the certain queue.

* * * * *